US007969910B2

(12) United States Patent
Barak et al.

(10) Patent No.: US 7,969,910 B2
(45) Date of Patent: Jun. 28, 2011

(54) ACCESS POINT PLANNING MECHANISM (75) Inventors: Oz Barak, Hod Hasharon (IL); Assaf Touboul, Natanya (IL)

(73) Assignee: Designart-Networks Ltd, Ra'anana (IL)

( * ) Notice: Subject to any disclaimer, the term of this patent is extended or adjusted under 35 U.S.C. 154(b) by 148 days.

(21) Appl. No.: 11/995,210

(22) PCT Filed: Sep. 9, 2007

(86) PCT No.: PCT/IL2007/001108
§ 371 (c)(1),
(2), (4) Date: Jan. 10, 2008

(87) PCT Pub. No.: WO2008/029411
PCT Pub. Date: Mar. 13, 2008

(65) Prior Publication Data
US 2010/0128630 A1 May 27, 2010

(51) Int. Cl.
*H04L 12/28* (2006.01)
(52) U.S. Cl. .................. 370/254; 370/330; 370/338
(58) Field of Classification Search .................. None
See application file for complete search history.

(56) References Cited

U.S. PATENT DOCUMENTS

| | | | | |
|---|---|---|---|---|
| 2002/0142788 A1* | 10/2002 | Chawla et al. | ................. | 455/504 |
| 2003/0145092 A1* | 7/2003 | Funato et al. | .................. | 709/229 |
| 2004/0114566 A1* | 6/2004 | Lim et al. | ...................... | 370/349 |
| 2004/0166871 A1* | 8/2004 | Backes et al. | ................. | 455/453 |
| 2006/0099954 A1* | 5/2006 | Henderson et al. | ............ | 455/447 |
| 2007/0002749 A1* | 1/2007 | Sondur et al. | ................. | 370/238 |

* cited by examiner

*Primary Examiner* — Chirag G Shah
*Assistant Examiner* — Otis L Thompson, Jr.
(74) *Attorney, Agent, or Firm* — Deborah Gador (57) ABSTRACT

A method for inserting an access point unit into a wireless telecommunications network, comprising: performing a self installation process in the access point unit, wherein during said self installation process, the access point unit automatically detects physical and RF layer parameters of access points around it, and selects its own physical and RF layer parameters according thereto, and/or performing a self-interconnection process in the access point unit wherein the access point unit contacts at least one feeder; and said feeder determines whether or not to permit connection of said access point unit to it.

20 Claims, 7 Drawing Sheets

TYPE II

TYPE I

ACCESS POINT PLANNING MECHANISM

FIELD OF THE INVENTION

The present invention relates to wireless communications networks, in general and, in particular, to next generation wireless mobile access point networks.

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

Communication in such networks is generally divided between access and backhaul. An access network is the air interface network providing traffic communication between mobile terminals (subscribers) and their associated access points (base or relay stations), while a backhaul network is the air interface network providing traffic communication between the various base stations and a core network. The networks may be arranged to transfer data alone, as in Wi-Fi networks, or may be arranged for triple play services (video, audio and data), typically WiMax (or other competitive technology, such as 3GPP-LTE). In conventional systems, the access network and the backhaul network each require their own separate transmission equipment, antennas, etc, at great cost to the operator.

One example of a conventional backhaul network is connecting wireless base stations to corresponding core mobile networks (ASN GateWay, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy (equipment and installation). In particular, due to the direct, uninterrupted line-of-sight requirements of the wireless backhaul equipment, the backhaul components of conventional base stations require strategic deployment location on high and expensive towers.

In traditional Point-to-Point (PTP) microwave backhaul operating in licensed bands or using unlicensed bands, OFDM (Orthogonal Frequency Division Multiplexing) or single carrier technology (constant power with a fixed modulation scheme) are typically employed. In OFDM, the channel bandwidth is divided into multiple concurrent parallel transmissions on several frequencies. However, during each time slot, there must be transmission over every frequency in the bandwidth. Thus, there is no granulation to permit correction of local interference, and, if there is a problem with transmission on one frequency, the entire transmission can be lost due to lack of frequency diversity, so the Signal to Noise Ratio (SNR) of a link (between two base stations) falls on the entire link.

Mobile WiMAX, as defined in IEEE Standard 802.16e-2005 Standardization for WiMAX, was originally designed to provide mobile broadband access for mobile devices, i.e., broadband wireless data-optimized technology, providing carrier-grade triple play services using a variety of user devices (such as laptops, PDAs, handheld devices, smart phones, etc.).

A complete mobile WiMAX Radio Access Network (RAN) requires deployment of massive infrastructure, including base station sites with high towers, base station equipment, antennas, and a separate backhaul network, as described above The traditional approach for mobile WiMAX network infrastructure deployment is similar to that of cellular phone networks. The network is based on macro-cell deployment, that is, the base stations, radios and antennas are installed on top of high towers, transmitting at high power, so as to maximize the base station coverage area. In order to optimize the cost, the goal is to minimize the number of sites, by extending the coverage range of each site. This can be achieved by deploying more powerful base station equipment for increasing the cell range (e.g., high power radios, multiple radios on each sector with smart antenna techniques), resulting in more expensive base station equipment. However, for a broadband wireless network deployment, this approach is adequate mainly for the coverage phase, when a relatively small number of subscribers share the cell capacity. As the cell coverage area is large, covering a large number of potential subscribers, additional subscribers in each area can rapidly be blocked due to limited base-station capacity.

There are also known outdoor Wi-Fi networks, deployed mainly according to outdoor Wi-Fi mesh technology. The typical Wi-Fi setup contains one or more Access Points (APs) (which is the equivalent terminology to Base Station in WiMax), having relatively limited range, deployed along telephone poles, street poles, electricity poles and rooftops. Due to the access point unit's smaller coverage range, a large number of access point units are required to cover a given area, typically between 20 to 30 access points per square mile, with wired backhaul at each 3 or 4 hops (known as micro- or pico-cell deployment). Conventional outdoor Wi-Fi access point units require costly power amplifiers in each unit to extend the capacity in the downlink, but are still limited by link budget in the uplink, due to limited transmission power from mobile station units (such as a laptop, which typically transmits about 20 dbm on a single small integrated antenna) and due to the fact that Wi-Fi utilizes OFDM, where there is no spectral sub-channelization in uplink, which would enable enhancing the link budget. In addition, conventional WiFi networks operate only on unlicensed bands, typically 2.4 GigaHz or 5 GigaHz bands, and suffer from severe interference and difficult radio planning issues.

Furthermore, in the micro/pico-cell deployment approach of conventional Wi-Fi mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive, due to costly equipment and installation costs. Furthermore, it is not feasible to deploy conventional Wi-Fi backhaul units on telephone poles, street poles, electricity poles, etc., due to the physical dimensions of the backhaul unit and lack of line of sight in urban below-rooftop deployment. In addition, when the network traffic load is increased in multi hop deployment, traffic capacity losses in the backhaul network drastically degrade the overall network performance (capacity and latency), due to incremental loading of cascaded access points in a certain route to the physical line backhaul.

Consequently, there is a long felt need for a wireless mobile broadband network supporting a low cost planning mechanism, as well as low cost installation and equipment deployment, and which permits relatively easy addition of new access points to the network. It would be particularly desirable for such a network to be relatively low in cost of initial infrastructure (coverage deployment), and also provides high capacity for supporting a large number of broadband data subscribers without high initial deployment cost.

BRIEF DESCRIPTION OF THE DRAWINGS

The present invention will be further understood and appreciated from the following detailed description taken in conjunction with the drawings in which:

FIGS. 4b and 4c illustrate two embodiments of sectorization by the antenna configuration of FIG. 4a;

DETAILED DESCRIPTION OF THE INVENTION

The present invention relates to access points in a next generation mobile wireless access network utilizing micro/pico cell deployment of access point (AP) unit base stations, like an outdoor Wi-Fi network and a point-to-point (PTP) backhaul network interconnecting the access point units to one another. For purposes of the present application, the term access point unit or node in all the access and backhauling descriptions refers to base stations, relay stations, etc., or any similar infrastructure device. Each access point unit according to the invention has self-planning capabilities, which include self-installation and self-interconnection in the network, particularly for traffic and management flow paths.

Self-planning access points enable a new node joining the network to automatically configure its own RF parameters, both in terms of bandwidth and transmission parameters, such as antenna beam pattern width, antenna polarization selection, antenna beam direction, beam transmission power and MIMO data streams allocated to it, and in terms of route. For purposes of the invention, an access network is the air interface network providing communications between Access Points (base stations) and mobile terminals (MS), including those defined by IEEE802.16e-2005 standardization (WiMAX), and a backhaul network is the air interface network providing wireless interconnection between access points within the network (and not between each access point and a core network).

This self-planning capability provides significant benefits to the operator, as it saves frequency-planning costs (new planning for additional nodes in the network), eases the installation and decreases its costs, and enables a quick and inexpensive way to increase the network capacity by adding additional access points without requiring high installation costs. In addition, self-planning allows easy deployment of broadband WiMAX and other mobile infrastructure by a technician skilled in the art, and no specialist in telecommunication networks is required.

Preferably, both access communication and point to point (PTP) backhaul communication are integrated on the same entity, and utilize the same antennas, radio hardware, digital hardware and MAC functionalities. According to one preferred embodiment of the invention, each access point or node has a single controller for controlling and coordinating both access and PTP backhaul communication. Thus, no additional, external equipment is required for backhaul communication between access points, resulting in a "zero-cost" interconnection. The PTP communication preferably operates over the same spectrum allocation (same frequency channel) that is used for access to the wireless subscriber terminals ("in-band" backhauling), and a single scheduler may manage the traffic allocation to both entities.

The network of the present invention is characterized by self-learning, which permits self-installation and self-interconnection of nodes. A self-installed WiMax access point network eliminates the need for deployment network planning, i.e, frequency planning, antenna direction alignment, antenna width tuning, and power allocation to each sector, each of which is required in conventional systems. This is accomplished by means of a mechanism in each access point unit which performs self-learning during deployment by determining physical and RF layer parameters of neighboring base stations and selecting its own physical and RF layer parameters in accordance therewith.

While the access points of the present invention can be used in any next generation mobile technology, for example, WiMAX, Wi-Fi, 3GPP LTE, GSM, etc., they are particularly suited for use in a wireless WiMAX network having a plurality of access point nodes serving, also, as an internal backhaul network between the various nodes, such as that described and claimed in Applicants' co-pending PCT patent application number PCT/IL2007/000875, entitled WiMAX ACCESS POINT NETWORK WITH BACKHAUL TECHNOLOGY. Therefore, they will be described herein with regard to such a WiMAX network, by way of non-limiting example only.

Figure 1:
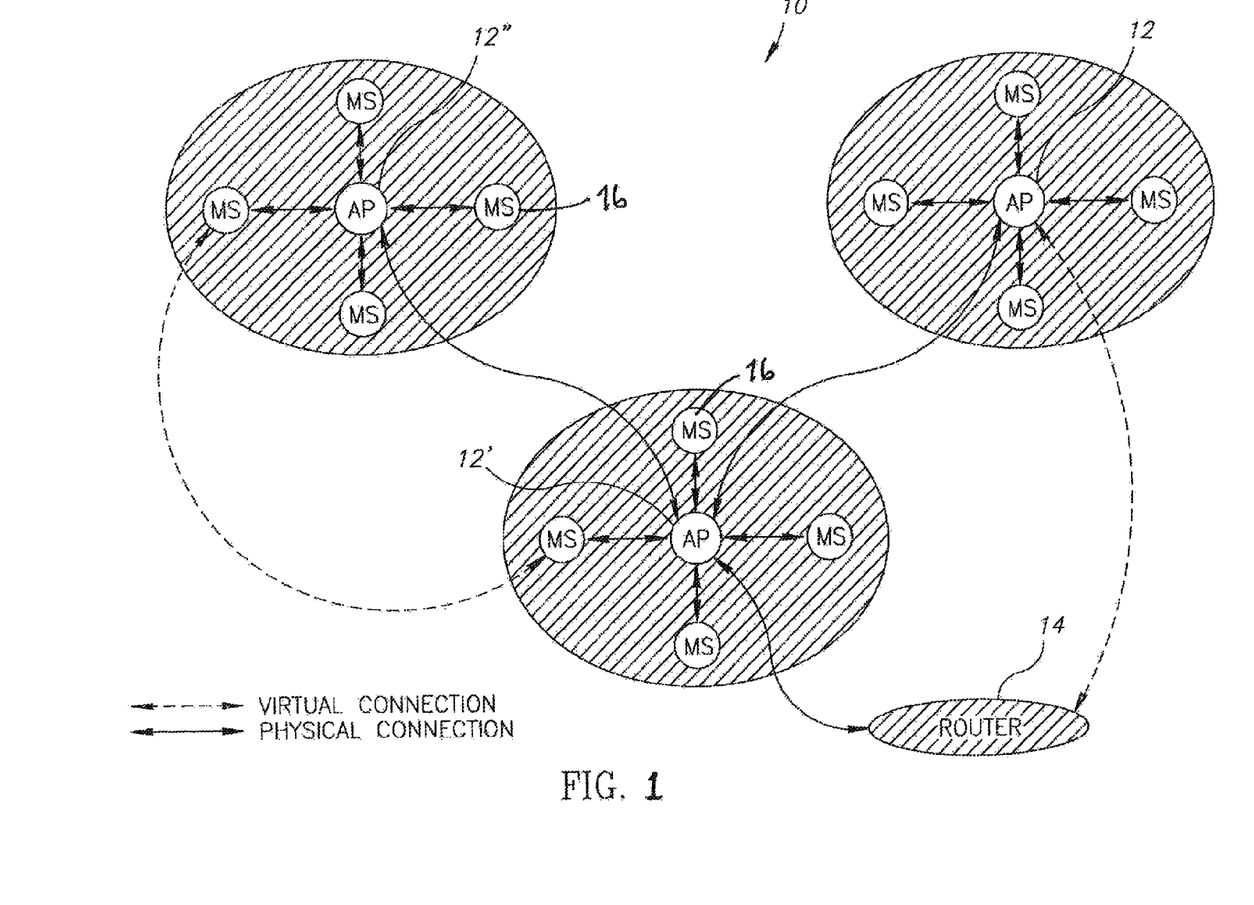
FIG. 1 is a schematic illustration of a wireless network having a self-learning mechanism, according to one embodiment of the invention.

Referring now to FIG. 1, there is shown a schematic illustration of a wireless network 10 having a self-learning mechanism, according to one embodiment of the invention. Network 10 includes a plurality of access point units 12, 12", each coupled for access communication to a plurality of mobile stations 16. The various access point units 12, 12" are divided into virtual clusters or cells and are coupled to one another via an internal Point to Point backhaul system. One access point unit 12' in each cluster, called a feeder, is coupled to, and manages all the other access point units in the cluster, and provides a conventional backhaul link to a core network for the entire cluster. Typically, the core network is an ASN-Gateway but not limited to it.

Deployment of the network is substantially as follows. A network plan is devised, indicating locations of feeder nodes, based on coverage predictions. A default configuration for boot strapping mode is processed by an SW algorithm embedded into the feeder nodes, and the feeder nodes are coupled to the data feeder (wired backbone). A clusterization network plan is also set—i.e., whether multiple clusters forming the network will utilize the same frequency, or whether a frequency re-use scheme (typically, re-use 1:3 or re-use 1:1 or re-use 3:3) (described in detail below) will be utilized.

Once the feeder access point units have been deployed, they transmit within their selected bandwidths, according to the deployment configuration defined by the operator. When a new access point node enters the network, it must learn the existing network and determine where it can fit in. Self-installation is enabled by self-planning algorithms utilizing smart antenna technologies. This process is illustrated in the flow chart of FIG. 2. First, the new access point performs PHY scanning (block 20), so as to determine the physical and RF layer parameters of the various access points around it, or selects parameters according to its pre-defined configuration set within its internal memory. If it performs scanning, it receives transmissions from all the feeders and other access points already around it in the network. Preferably, each access point unit performs space and frequency channel sounding, so as to produce an "RF spatial map" of the environment frequencies, i.e., on which frequencies which nearby access point units are broadcasting according to which frequency Re-use scheme.

Figure 2:
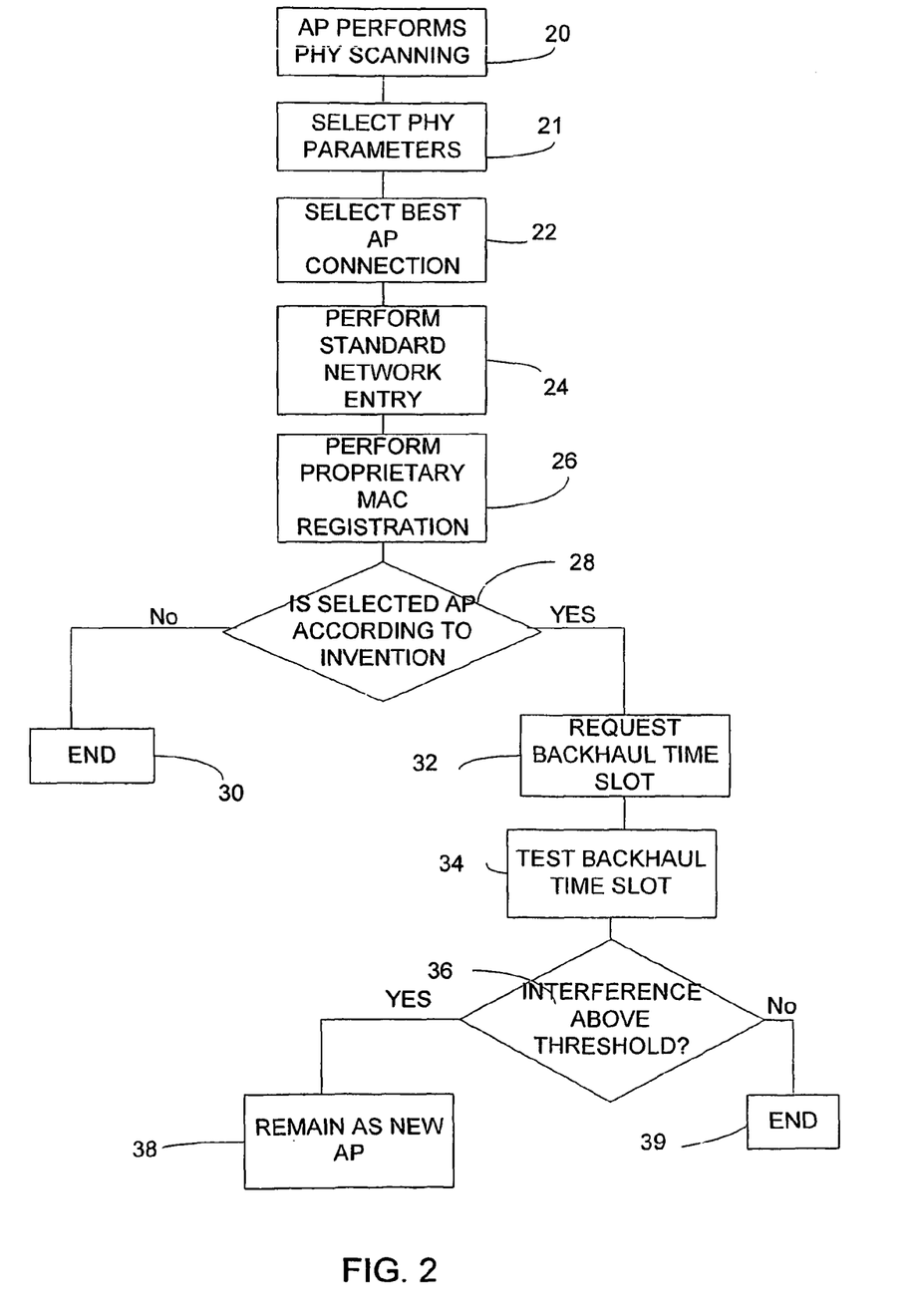
FIG. 2 is a flow chart illustrating self-installation of an self-installing access point unit in a wireless network, according to one embodiment of the invention.

In one preferred embodiment for a WiMAX network, during the self learning process, the access point automatically detects WiMAX 802.16e physical layer parameters of the access points within the cluster and access points in adjacent clusters around it, including the existence of a frequency re-use scheme (defined in WiMax networks as Re-use 1 or Re-use 3), and the type of the WiMAX frame permutation methods—PUSC, FUSC or AMC schemes, if any, that are in use. It also detects beam direction of departure from the edge access points of each of the surrounding clusters, as well as the beam width and pattern and sectorization beam center, in case of sectorization (described below).

Based on the signal strength, direction and other selected parameters of the signals received, the new access point selects the appropriate physical and RF layer parameters for itself (block 21), including bandwidth (frequency range), FFT size, guard time used, permutation scheme, directions of beam arrival and the distribution of the beam in space (a rough approximation of beam width), as well as beam power, for each sector of its own access transmissions, as well as the frequency to be assigned to each virtual sector (in case of re-use 1:3).

In order to perform this function, one preferred embodiment employs software that controls the modem and radio functionalities, in order to incorporate a Spatial Spectrum Analyzer, which enables spatial spectral interference management. The new access point determines which frequency or frequencies are available in which directions, with the least interference from adjacent access points, and then utilizes beam-forming techniques to maximize its own coverage. Interference management is based on the principle that fixed beam forming in access generates a constant interference pattern, and constant interference is manageable. The access points of the present invention take advantage of interference knowledge, and utilize power control, and sub-channel management, as well as null steering (spatial filtering in Up Link and D1 Link) and in-band sub-channel selection in Down Link, for interference management, as known.

Thus, when a new access point 12 is added to the network 10, it first undergoes installation in the access network (preferably self-installation, but alternatively manual installation by an operator), which means that it performs multiple access beam forming adaptation and power adaptation to enter the existing re-use deployment scheme. In one embodiment of the invention, the new access point now undergoes self-interconnection, or best route selection, in order to enter the backhaul network. By the end of the self interconnection process, a feeder node will allocate to the new access point a backhaul time slot within the cluster.

The self-interconnection process is substantially as follows, with further reference to FIGS. 1 and 2. The new access point must be synchronized with all the access points 12, 12" around it in the cluster that are transmitting a downlink signal in its range of frequencies. By utilizing beam forming techniques, the access point maps the various access point transmissions, the angle of arrival from each access point, signal to noise ratio (SNR) over all the routes toward one or more feeders in its range, available capacity, interference metrics, and other selected parameters. A router 14 may be provided to feed data to the feeder. (The router or ASN-GW is above the WiMax air interface network, in the case of a WiMAX network.) In this way, the new access point 12 will indicate to a feeder 12' that it wishes to connect to it.

In accordance with the mapped data, the feeder node will select the best route to it for the new access point. This will be the route on which the new access point entering the cluster will experience the best throughput performance without substantially reducing the feeder node capacity. In case there is a conflict between these two requirements, the feeder node capacity has higher priority. It will be appreciated that the access point unit may have to approach the feeder node directly or through one or more alternative relay nodes, in order to permit the feeder to find an acceptable route to it.

The new access point now connects to the selected access point (which may be the feeder node or another access point (relay node) which is, itself, coupled to the feeder node), as if it were a mobile station.

The self-interconnection process of an access point (AP) to the backhauling network, according to one embodiment of the invention, is illustrated in block diagram form in FIG. 2. While the access point underwent self-installation, it performed pre-selected physical and RF layer scans (beams, azimuths, frequencies, modem specifics parameters, etc.) and located one or more access points transmitting on different frequencies (block 20). According to the collected data from these scans, the self-installing access point selects the best access point to communicate with (block 22) based on link conditions, such as SNR, RSSI and Bit Error rate observed on this link, and performs a standard 802.16e network entry registration (block 24) as a 'Special Mobile Station', which includes ranging processes, capability negotiation, etc., ending by registering to the selected access point. This means that the new access point performs a proprietary MAC registration (i.e., communicates via, for example, an IEEE802.16e network entry protocol) with the feeder, either directly or via a relay access point, and requests a backhaul slot (block 26). If the selected "best" access point is not an access point according to the invention (block 28), the new access point continues to provide access services to its mobile stations, and continues to seek a backhaul connection elsewhere, thus ending the registration process (block 30).

If the selected access point is an access point according to the invention (block 28), at the end of the registration process, a special MAC message will be sent to the access point indicating this fact. The access point will now request the feeder to allocate to it a backhaul time slot (block 32). (In the case of a multi-hop relay, the relay will forward the request to the feeder.) The feeder now selects the best backhaul route to the feeder node and allocates temporary PHY and MAC parameters, such as available capacity, time slots, sub-carrier allocations and other interference and cluster-related parameters (block 34). In one embodiment of the invention, during the following transmissions, the access points in the entire cluster measure the interference generated by transmission on the proposed link (block 36) to determine the level of interference generated (block 37). If the best connection for the access point results in interference for the cluster above a pre-selected threshold level, the feeder will reject the connection (block 39) and disconnect the new access point, and the access point will have to seek a different feeder in another cluster. Otherwise, the new access point remains on the allocated backhaul slot (block 38), retaining the temporary PHY and MAC parameters, which now become its fixed parameters. This new route remains as a fixed route until a change occurs within the access point clusters, or the feeder decides to change the route due to interference issues.

It will be appreciated that, since the feeder node decides on the best route of hops to interconnect each access point with each other and with the feeder access point, once a backhaul time slot has been allocated to a new access point, the feeder must reconfigure the backhaul over the entire cluster, taking into account topology and interference measurements over the network. The feeder now re-allocates backhaul time slots between each link in its cluster. The routing protocol is controlled by the feeder access point such that the feeder sets up each route to each access point based on spatial interference between access points and within acceptable frequency band interference. Periodically, the feeder access point can update the routing table for each access point to the feeder access point.

A wireless next-generation mobile node or access point, according to one embodiment of the invention, serving as an access point unit or base station (or relay station) is described in detail in Applicants' PCT cited above. Each node includes at least one and, preferably, a plurality of RF transceivers for access to mobile stations within its coverage range, as well as for the high capacity backhaul point-to-point (PTP) link for communication with other nodes in the network.

Each RF transceiver is coupled to an antenna. Preferably, the antennas are omni-directional antennas, although alternatively, they can be directional antennas. A suitable modem is provided between each RF transceiver and its associated antenna. Both access and backhaul are coordinated and synchronized by a single controller, for example, a MAC controller, coupled to the transceivers via the modems, permitting utilization of the same hardware resources of the node, that is, the same radio, modem and antenna elements, for both access and backhaul.

It is a particular feature of the invention that each node or access point unit is based on low-cost, standard off-the-shelf radio transceivers with power amplifiers ("terminal RF-IC" modules), such as those used at present in mobile consumer terminals. According to a preferred embodiment, each node also includes a plurality of low-cost standard omni-directional antennas, preferably arranged in groups of 6, 9 or 12 antennas.

The access point unit according to one exemplary embodiment of the invention incorporates six radio hardware chains, each of which transmits and receives RF signals to/from one of the six antennas, and the modem transmits signals over the six antennas to perform sectorization via beam forming techniques or MIMO. When using directional antennas, the direction and width of the beam are dictated by the antenna physical location and antenna characteristics. However, the use of omni-directional antennas permits later selection of beam characteristics by forming virtual antenna groups, using smart antenna techniques configurable by software.

Formation of virtual antenna groups, according to one embodiment of the invention, will now be described. A bit stream (data or symbols) to be transmitted can be transmitted over a link by all the antennas in the node or by sub-groups of antennas (e.g., 2, 3 or 6, depending on the total number of antennas in the node). As known, transmission of the same stream (1 stream) over all the antennas will improve the SNR, and the spectral efficiency will increase in proportion to the improvement in SNR. However, if the bit stream can be split into two or more MIMO streams by the modem (PHY) in the node, then the rate can be doubled (or higher) by transmitting more than one symbol on the same frequency at the same time. This, of course, will reduce the link budget per stream, which will reduce the SNR per stream.

Each MIMO stream is allocated an appropriate grouping of antennas, according to the network and/or the link configuration. Transmitting multiple streams can be accomplished when the streams are spatially separated. This separation can be gained by physical geometry separation between antennas or by rich scattering contributed by the channel, or where the streams are separated by polarization of the electromagnetic fields of the antennas, such that each stream has a different polarization, or by any other means of parallelization of the streams within predefined channels. Thus, the capacity can be increased by a factor of the number of streams since, when utilizing MIMO techniques, each receiving antenna can cancel adjacent stream interference, so as to properly receive the stream that was directed to it.

Figure 4A:
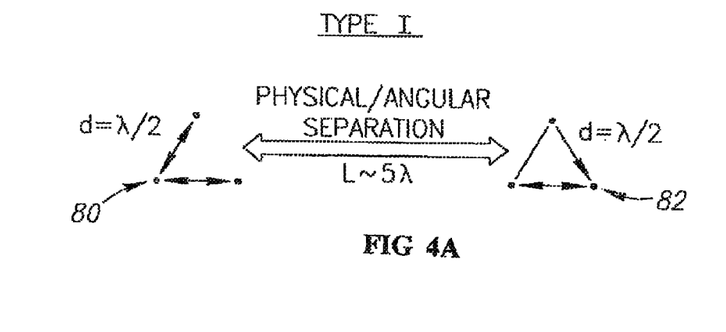
FIG. 4a is a schematic illustration of an antenna configuration according to one embodiment of the invention.

One proposed antenna configuration, illustrated schematically in FIG. 4a, involves allocating antennas to create two groups 80, 82 of antennas, each having three omni-directional antennas arranged in a triangle (as shown in hardware in FIG. 4a). As seen in FIG. 4a, the antenna groups 80 and 82 are spatially separated, with the distance d between antennas in each group typically being lambda/2, with distance L between two groups, typically >5 lambda. Alternatively, two groups of three omni-antennas can be utilized at smaller spatial distances, i.e. L<5 lambda, with polarization, i.e., one group being vertically polarized and the second being horizontally polarized, as when there is a 90° mechanical angular spatial separation between the antennas.

Figure 4B:
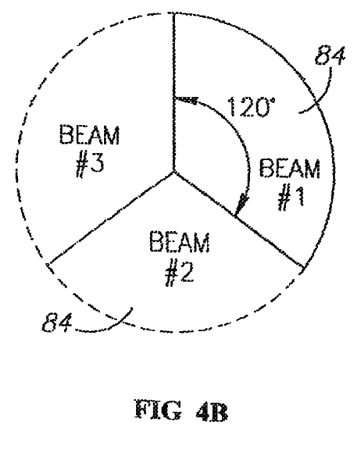

In the configuration of FIG. 4a, each group of antennas generates three beams 84 (of 120° each) using beam-forming, as shown schematically in FIG. 4b. In addition, a diversity scheme between the two groups of antennas is preferably employed, using transmit and receive diversity methods, such as STC (Space Time Coding), CDD (Cyclic Delay Diversity), MRC (Maximum Ratio Combining), selection diversity, which provide enhancement of the link budget, resulting in increased SNR and increased spectral efficiency. These techniques can be used in either access or backhaul or both. Thus, the transmission can use one stream with one of the above diversity schemes, or two MIMO streams to enhance the capacity while sacrificing the link budget.

Figure 4C:
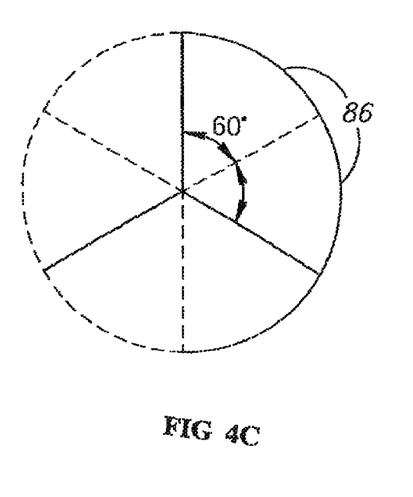

As seen in FIG. 4b, six beams can form three virtual sectors, where each virtual sector transmits and receives in a different frequency range. Beam-forming can also be used for sub-sectorization of each sector into two sub-sectors (additionally increasing the link budget), to provide essentially six sectors 86, as shown in FIG. 4c. This technique is useful, in access only, to increase link budget. Here, each sub-sector is 60° (360°/6), so each pair of beams forms a sector and uses the same frequency group. In this embodiment, it is important to note that in order to produce 6 sub-sectors with two streams in the same time, twelve antennas are required, six antennas for 60° sub-sector and six antennas for the additional stream. In FIG. 4c, the pairs forming each sector are illustrated as being adjacent to one another, but they are not limited to such configuration.

When there are two MIMO streams transmitted over six antennas, each stream transmitted to and from three antennas, the beam width can be 360/3 or 120°. Thus, in this case, the rate is twice the rate of one stream and the spectral efficiency is twice that of one stream. However, the beam is wider, causing the link budget to go down.

Similarly, where three MIMO streams are transmitted over six antennas, each stream is transmitted to and from two antennas at a beam width of 360/2 or 180°, resulting in three times the spectral efficiency but much lower link budget and more difficult reception. This option requires an antenna configuration of three pairs of antennas (not illustrated).

Figure 4D:
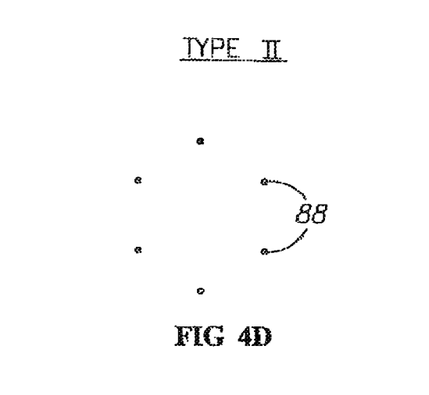
FIGS. 4d and 4e are schematic illustrations of an antenna configuration according to an alternative embodiment of the invention.
Figure 4E:
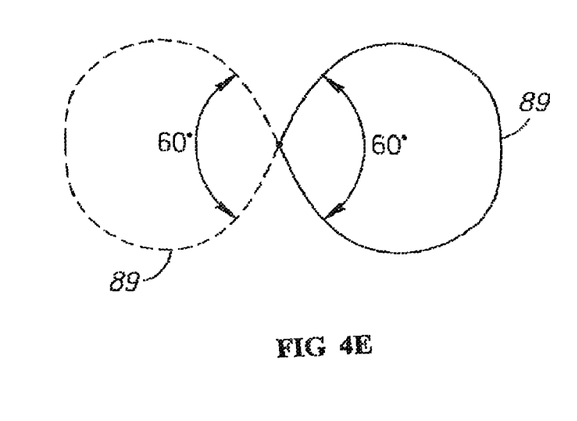

An alternative proposed configuration is 6 antennas 88 arranged in a circle, as shown in FIG. 4*d*. With this configuration, two beams 89 of 60° are generated by the six antennas, as shown in FIG. 4*e*. Only beam forming for single transmissions or SDMA for multiple concurrent transmissions (described in detail below) can be utilized. (Since these antennas are not sufficiently separated spatially, MIMO cannot be utilized.)

Another alternative embodiment is to utilize a plurality of directional antennas. For example, using directional antennas of 90° each, the angle of each antenna should be 90° divided by the number of antennas times the number of streams.

Although the number of antennas is configurable (i.e., selected in advance and fixed in the hardware), the number of streams preferably is dynamic and adaptive, and is adjusted over time.

According to some embodiments of the invention, sectorization of each communications cell is provided. A sector is a logical entity (segment of bandwidth) managed by a single virtual MAC (MAC instance) and a modem functionality (physically including an antenna front end module, MIMO beam forming device and RF transceiver and antennas). Cell sectorization is associated with applying several PHY\MAC entities to a cell (e.g., three sectors per cell), where each sector gives service to a centralized zone in the cell, preferably 120° sectors. The antenna configuration in the system of the present invention allows inherent sectorization within a cell, by using directional antennas, or by use of beam forming techniques which control the radiation of the beams from a plurality of omni-directional antennas. Virtual antenna sectorization permits the use of low cost omni-directional antennas, where the antennas utilized act as directional antennas towards each sector, by utilizing fixed beam forming techniques.

Figure 5:
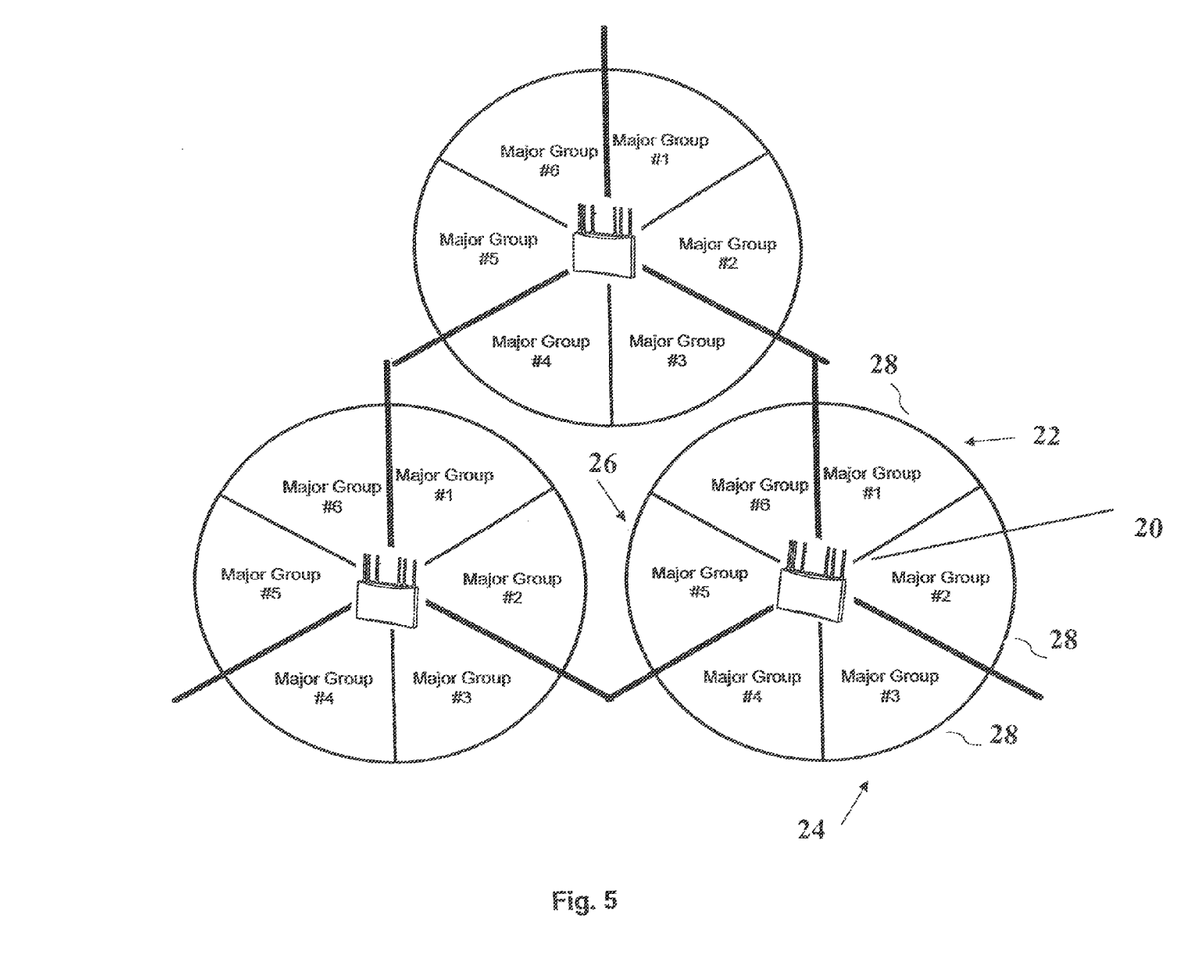
FIG. 5 is a schematic illustration of a sectorization allocation, according to one embodiment of the invention.

One embodiment of the self-planned beam building of this invention will now be described, with reference to FIG. 5. A full implementation of a fixed beam forming solution is provided, in two different configurations. In these embodiments, beam forming is accomplished using 6 antennas 20, with a link budget gain of ~12-15 dB, maximum output power about 23 dBm, and equivalent to high power 37 dBm BS radio. This results in increased cell range, reaching as far as about 400 m. The beam forming generates sectorization, i.e., dividing the space around each antenna array into 3 sectors 22, 24, 26, or into 6 sub sectors 28. Sectorization is required for frequency planning, i.e., to create a 1:3 Re-use frequency plan. It will be appreciated that, in the present invention, no directional antennas are required, but rather simple omni antennas are used.

Figure 6:
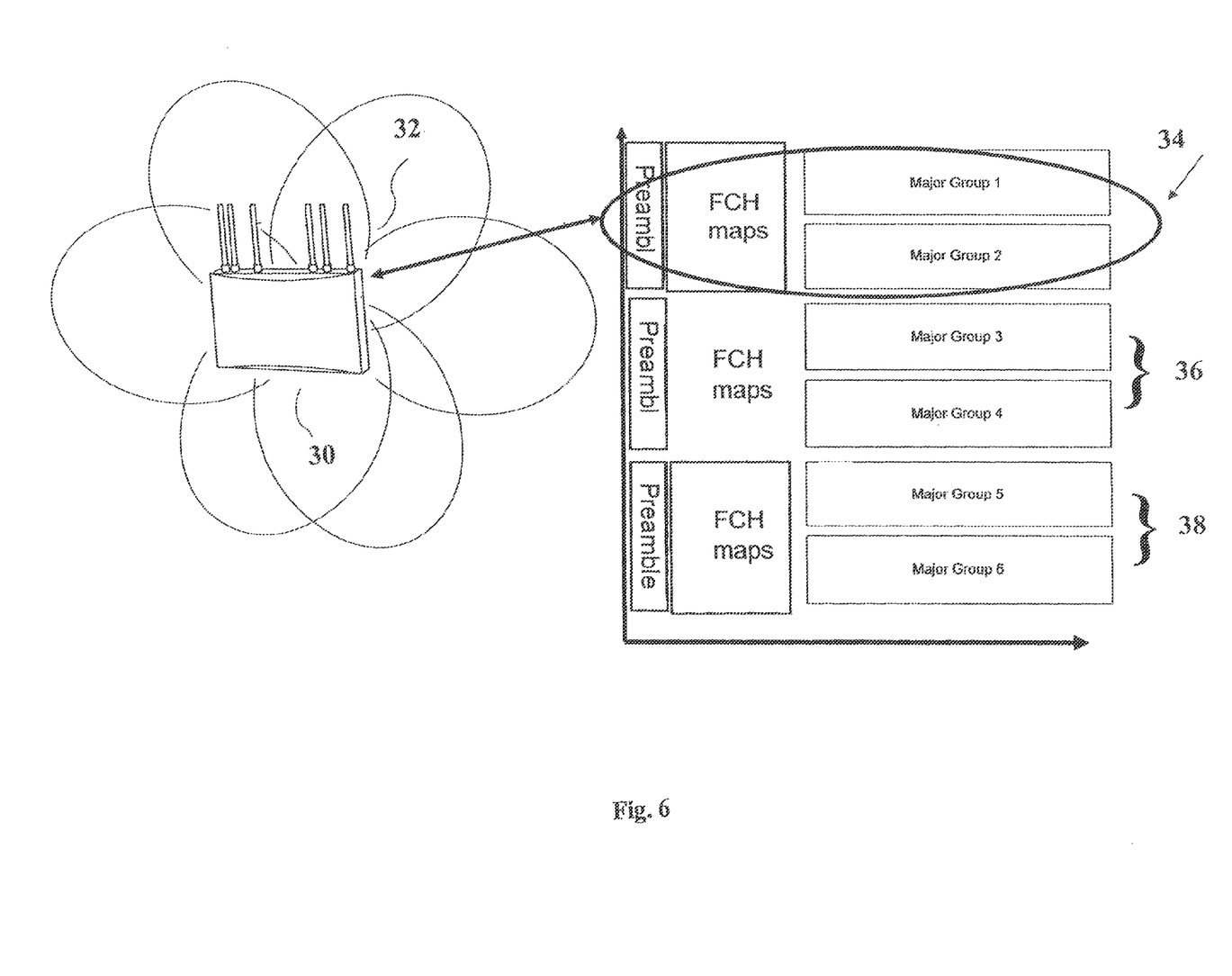
FIG. 6 is a schematic illustration of a fixed beam forming division, according to one embodiment of the invention.
Figure 7A:
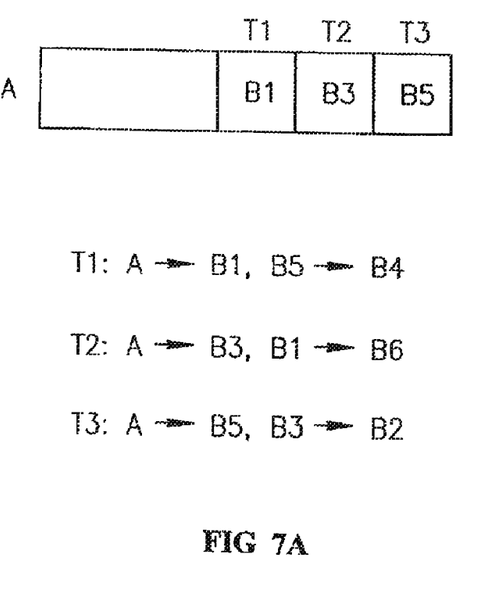
FIGS. 7a and 7b is a schematic illustration of a self-learned sectorization scheme for interference mitigation, according to one embodiment of the present invention.
Figure 7B:
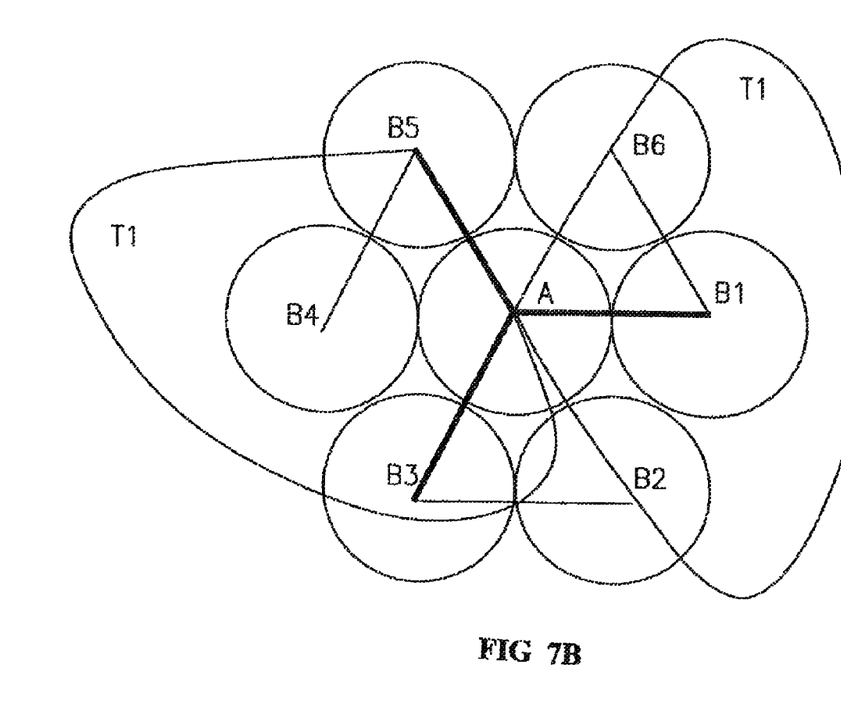

In a first configuration, illustrated schematically in FIG. 6, fixed beam forming is provided by 6 beams on 3 sectors 34, 36, 38 (6-sectorization), utilizing a 6 uniform linear array antenna arrangement 32 on the AP unit 30. Preferably, the antennas are optimized for maximum link budget and maximum range. This arrangement is best suited for suburban/rural deployment.

In this arrangement, the spatial spectrum around each antenna array 32 is divided into sectors, here illustrated as 3 sectors, each using a different sub-band of the available bandwidth. Concurrent transmission is permitted on adjacent major group bandwidth on each sector in such a way that it can be guaranteed that there will be no interference within the cell. Peak rate can be guaranteed for each mobile station within each sector by load balancing the sectors (while still preserving the Re-use factor).

PUSC is utilized to exploit frequency diversity. Re-use 1 is supported by PUSC permutation with different cell IDs with low interference when filtered out by coding methods. Spatial multiplexing can be employed to increase capacity for close mobile stations, even though the system is not sensitive to mobile station mobility. It requires beam selection only. Since the beams are fixed, they produce a stable and relative stationary interference pattern in adjacent cells. Thus, when the Base Station must select a modulation for a certain Mobile Station, it can do so based on relatively stable SNR and, thus, requires only a small link adaptation modulation margin.

An alternative configuration (not shown) of the self-frequency selection process includes fixed beam forming, combined with Space Time Coding (STC). In this case, there are 3 beams plus STC on each sector, utilizing a 3 uniform linear array antenna arrangement, for example, separated by 6-10 lambda. The arrangement is optimized for high multipath environment (STC diversity gain) and is best suited for dense urban deployment. In this arrangement, for the down link, there is provided fixed beam forming—3×120 degree sectors for coverage improvements, with 3 sectors for MAC management and Re-use plan. MAP and management are robust modulated bursts, with small overhead due to the large beam. Traffic bursts are preferably transmitted in narrow beam to increase coverage and capacity. This arrangement may utilize PUSC with partial loading (⅓ or ⅙) with dedicated pilots. With 3×MAC segments, it fully supports Re-use 1:3 planning. In the up link, adaptive beam forming is utilized, preferably MMSE utilizing PUSC permutation, but SVD or MRC are also possible algorithms for this kind of adaptation.

The networks of preferred embodiments of the present invention support several radio access network deployment frequency re-use schemes. The frequency re-use scheme defines the division of bandwidth (frequency channel) between sectors of a cell or between entire cells. A frequency reuse of 1:1 (as Full Usage of SubCarriers (FUSC) in WiMax) implies that all cells use the same sub-carriers (frequency band or sub-band) F across their borders, as illustrated in FIG. 6*a*. Though this system features maximum spectral efficiency and does not require resources for planning allocation, relatively large inter-cell interference is generated. An alternative re-use 3:3 is shown in FIG. 6*b*, where each cell in each group of 3 cells utilizes a different frequency band or sub-band $f_1$, $f_2$, $f_3$ (out of 3 possible bands). This arrangement provides increased link budget in each cell at the expense of capacity of each cell, which is reduced to one third.

A frequency re-use scheme of 1:3, as shown in FIG. 6*c* (e.g., as in Partial Usage of Sub-Carriers (PUSC) in WiMax), indicates that each cell is divided into three sectors, and each sector operates in a different frequency band or sub-band (⅓ of the spectrum) $f_1$, $f_2$, $f_3$, with coordination between cells to minimize interference. In this case, beam-forming is used to perform virtual sectorization. This approach minimizes inter-cell interference, though the peak spectral efficiency is degraded by 3 on each sector, thus each sector peak rate is reduced by 3.

The frequency re-use scheme will be selected depending on the network deployment topology. Re-use 1:3 is the default re-use scheme for use by the access point units of the present invention. In this case, the available bandwidth is divided to 3 groups of bandwidths, each driven by a separate MAC instance (virtual portion of the MAC controller) or preferably, the MAC controller manages three MAC instances, one for each virtual sector. Thus, a single controller coordinates and controls all three groups. Power management on each subcarrier, sub-band or band is provided to control access point density topology and network interference management.

Each access point should transmit a preamble which signals a MS of the presence of a base station and a set of deployment parameters (type of the Re-use frequency scheme) and base station information.

The frequency selection algorithm is based on the preamble detection algorithms which will be performed by the access point and detect the preamble presence, Cell ID, frequency re-use scheme and timing frequency offset and carrier frequency offset. This algorithm is usually performed by a mobile station, but in this invention, which is unique to the present invention, it is performed by an access point targeting to learn the deployment for installation into the network.

Figure 3:
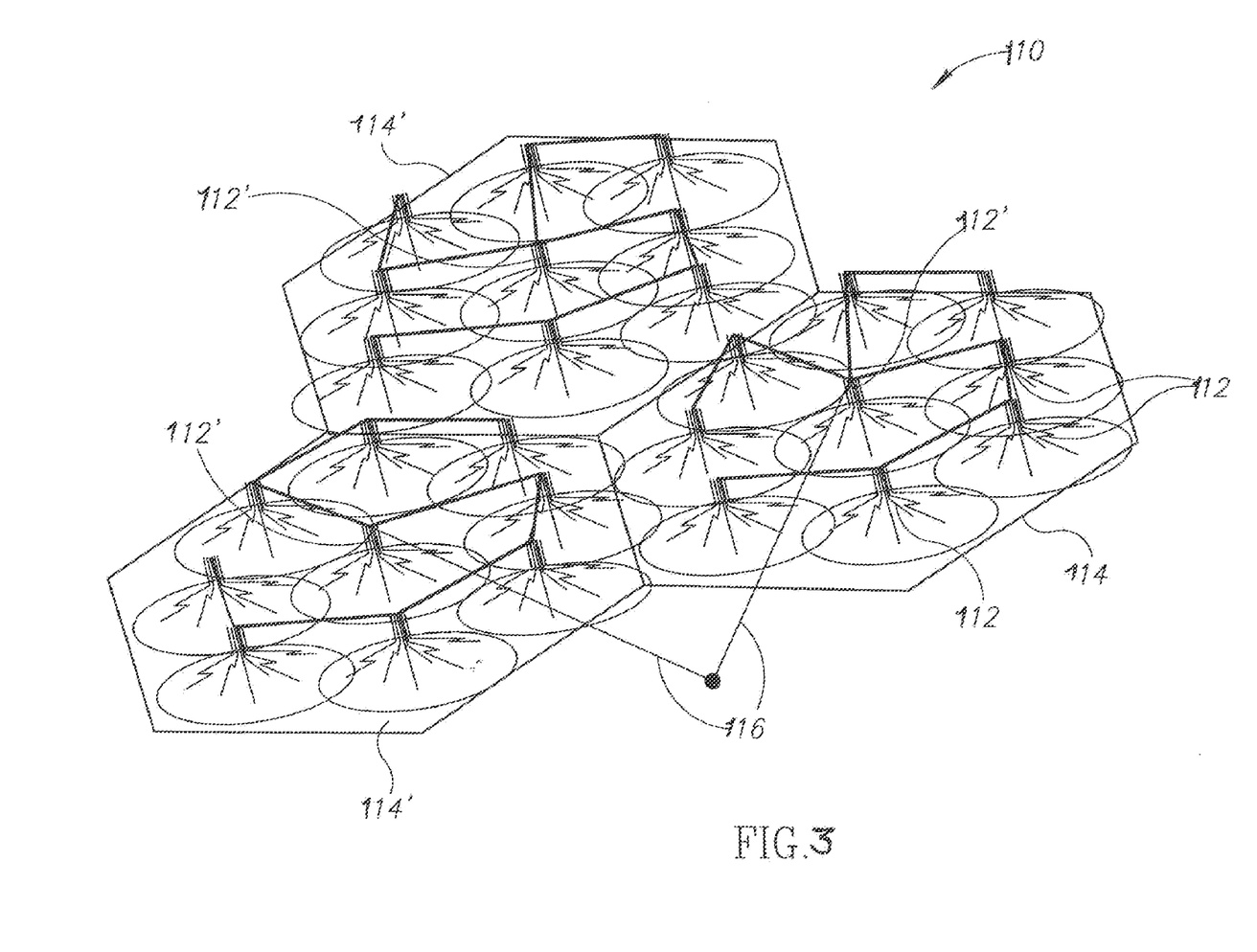
FIG. 3 is a schematic illustration of a WiMAX network constructed and operative in accordance with one embodiment of the present invention.

Referring to FIG. 3, there is shown one example of a WiMAX network 110 according to the present invention. The WiMAX network 110 includes a plurality of access point (AP) units 112, each of which acts as a base station for its cell. The AP units 112 are deployed in micro/pico cells, and can be mounted on street lamp posts, telephone or electric poles, roof tops, etc., as known in conventional outdoor Wi-Fi networks. Each AP unit 112 includes a built-in self-backhaul and self-planning mechanism, so that only a single box need be installed in each location, which results in easy and low cost site preparation (no need for preparing wired backhaul to each node, but only to one node) and a low-cost installation (single unit installation). Preferably, each AP is based on standard off-the-shelf "terminal RF-IC" modules and omni-directional antennas.

The network of the present invention is a unique, high-efficiency, proprietary interconnection network including a plurality of nodes or AP units 112. For purposes of the present application, the term AP unit refers also to base stations and to relay stations. Deployment coverage is provided by a network of base stations, which is logically divided to multiple clusters 114, 114' (defined as a logically connected group of base stations). Each cluster 114 is a formed of a group of nodes 112 wirelessly interconnected to each other (as shown in heavy black lines), each of which provides wireless access to part of the cluster. Thus, no macro sites are required. In each cluster, one of the nodes coordinates all the access points within the cluster and manages the backhaul network interference-mitigation scheme. This access point is referred to as a feeder node 112'. The feeder nodes 112' in each cluster are physically connected to the wired backhaul 116 and serve as the backhaul connection point of the whole cluster 114 to the core network (not shown).

The nodes in the cluster 114 are interconnected in a tree topology (preferably star, multi-hop and any combination of these two topologies), the 'feeder node' being the root of that tree. All traffic from all nodes in the cluster is routed to and from the feeder node, and then to the wired Internet network. The path from each node communicating with the feeder node is determined at the time it joins the network, as described below, and is known and static under given link and network conditions. Alternatively, routing can also adapt itself due to traffic load sharing between nodes, interference conditions, and other deployment issues.

Each node provides access to wireless broadband subscribers in its cell coverage area and communicates with another node in the cluster (via an inter-AP point-to-point backhaul link), either directly with the 'feeder node' or via another node as a relay, to transfer its aggregated traffic towards the core network. Preferably, the average number of hops is minimized. On average, preferably only 1-2 AP hops will be required to reach the feeder node in a typical deployment (according to the typical density of wired backhaul feeding points in Metro areas).

One of the parameters selected or acquired by each access point by means of self-learning is the appropriate sectorization parameters for its transmissions. These include the number of sectors, the frequencies of transmission over each sector, and the time slots for transmission and reception in each sector. In order to reduce interference between sectors, the frame structure of the communication channel between base station and mobile station and between base station and base station can be divided in the time domain. One example is illustrated schematically in FIG. 6a. During each of three time slots T1, T2, T3, a feeder node A, coupled to a core network, communicates over a link with one of the access points B1, B3, B5, each of which communicates with one or more mobile stations. At the same time, one of the second hop (tier 2) access points B4, B2, B6, which communicates with the feeder node A through another access point, can communicate with its adjacent access point. In this example, B5 communicates with B4, at the same time as A communicates with B1, during time T1. This is possible due to the network characteristics set forth above, so that little or no interference is measured in the coupling of these two links.

As can be seen schematically in FIG. 6b, beam forming has provided two substantially triangular coverage areas during time T1, which substantially do not interfere with one another. The groups of links having transmission at any given time can change, as set forth in FIGS. 6a and 6b, the highlighted links being operative concurrently. Thus, PTP (Point to Point backhauling) transmission is illustrated as occurring concurrently between feeder node A and relay B1, and between access points B5 and B4. During a different time slot, PTP transmission occurs concurrently between feeder A and relay B3, and between access points 81 and B6, and during a third time slot, PTP transmission occurs concurrently between feeder A and relay B5, and between access points B3 and B2. Since these backhaul links are geographically separated, transmit over a same radio frequency range, at a same time, they can provide concurrent backhaul transmissions on a single radio frequency channel, substantially without creating interference and fully reuse the radio resources in each time slot.

It will be appreciated that the feeder access point reserves a constant capacity (e.g., allocation of time over channel bandwidth) for each access point within the cluster. It should be noted that the feeder access point can learn the traffic requirements for each access point toward a route and dynamically optimize operation of the access point, by adapting the capacity to each route based on a set of predefined operator rules, such as minimum delay to a predefined access point, prioritizing the access point within the cluster (access point class of service), access point minimum/maximum rate, average rate, constant rate requirement and any other additional rate management required by the operator. A connection-oriented protocol preferably provides fully controlled latency and jitter—1-2 frame constant delay.

Periodically, the feeder measures the interference in its cluster during access transmissions and can adapt power, beam direction, PHY configuration and frequency in order to reduce the interference to the minimum level possible, under current conditions. The feeder will instruct whichever node is causing interference in the cluster to lower its power and measure again. It will be appreciated that, as additional access point units are added in a given area, in order to increase capacity, it is possible that the feeder node, itself, will be the node causing interference in the cluster. If this is the case, the feeder will reduce its own transmissions in access until the interference is resolved. Thus, in some cases, the feeder will no longer be required for access transmissions at all, but can devote itself to providing only backhaul services for all the relays in the cluster coupled to it.

It will be appreciated by those skilled in the art that self-planning saves the frequency planning costs from the operator. Self-planning is preferably performed automatically periodically, as well as upon any change event in the network. It is essential mainly when increasing the access point density ("capacity phase") of the network.

Another advantage of the self-learning capability of the present invention is that it is makes the network self-healing. The network is resilient, and can reduce network failure substantially to a single point. Thus, if an access point discovers that it can no longer contact an adjacent access point, it will notify all the other access points in the cluster and adjust its own installation parameters accordingly.

According to one embodiment of the invention, a protocol runs periodically between each feeder and its associated access points, to check that all registered access points still exist in the network, similar to a "keep alive" message transmitted periodically, which is acknowledged by each access point. Preferably, each access point also can run a self connectivity "keep alive" to the access point it is attached to, to ensure that it is still connected to the network. In case the access point does not receive any "keep alive" message from the cluster feeder for a pre-defined period of time, it will conclude that the adjacent access point is lost. Similarly, the feeder node and other access points coupled to the lost access point will discover the absence of that access point. The disconnected access point will now undergo re-registration, self-installation and re-connection, as described above. It will be appreciated that, at this time, the access point may connect to a different access point or even to a feeder node in a different cluster, depending upon the operator strategy and the local conditions.

It will further be appreciated that, if the node which loses connectivity is a feeder node, all of the access points previously connected to it will automatically undergo re-installation. Of necessity, all these access points will now connect to feeder nodes in different clusters, at least until the original feeder node is replaced, if at all.

It is a particular feature of the invention that the interconnection process described above is automatic and self-contained within the various access points, thereby providing advantages to the network, particularly in cost and uninterrupted service.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for inserting an access point unit, having at least two antennas performing receive beam forming, into a wireless telecommunications network, comprising:
   performing a self installation process in the access point unit, including: automatically detecting, by the antennas in the access point unit, spatial physical and RF layer parameters, including direction of arrival, of access points around it, and
   selecting its own spatial physical and RF layer parameters according thereto for both access communication and wireless backhaul communication between access points in the network.

2. The method according to claim 1, wherein said spatial parameters include physical and RF layer parameters including at least one of: the existence and type of spatial frequency re-use scheme; the existence and type of the WiMAX frame permutation methods; beam direction of departure from edge access points of surrounding clusters, beam width and pattern and sectorization beam center, in case of sectorization.

3. The method according to claim 1, wherein said step of automatically detecting includes:
   performing space and frequency channel sounding;
   producing an RF spatial map of environment frequencies, in accordance with said channel sounding;
   performing spatial spectral interference management mitigation; and
   selecting available transmission parameters for each said access point unit.

4. The method according to claim 1, further comprising utilizing beam-forming techniques to perform at least one of virtual sectorization, according to an environment frequency re-use plan, and setting sectorization beams, and frequency bandwidth and/or power for each sector.

5. A method for inserting an access point unit into a wireless telecommunications network having a plurality of access point units grouped into virtual clusters, each cluster having one feeder access point unit coupled to and managing all the access point units in the cluster and providing backhaul to a core network, the access point units communicating with the feeder by means of wireless point-to-point backhaul, the method including:
   performing a self-interconnection process of the wireless backhaul coupled to in the
   access point unit wherein the access point unit
      performs receive beam forming using a plurality of antennas;
      performs space and frequency channel sounding;
      produces an RF spatial map of environment frequencies and direction of arrival, in accordance with said channel sounding;
      performs spatial spectral interference management;
      contacts at least one feeder; and
      provides said spatial information to said feeder; and
   said feeder determines whether or not to permit connection of said access point unit to said feeder for wireless backhaul and selects available spatial transmission parameters for said wireless backhaul in the access point unit.

6. The method according to claim 5, wherein said feeder further selects a best route for wireless backhaul communication with said access point.

7. A method of adding an access point unit having an RF transceiver and at least two antennas performing receive beam forming to a mobile wireless network having at least one node and point-to-point wireless backhaul between nodes, the method comprising:
   selecting one of said at least one node for forming a wireless connection thereto;
   determining spatial physical layer parameters of said selected node including direction of arrival:
   performing standard network entry;
   performing MAC registration;
   requesting a wireless backhaul slot for wireless backhaul communication with said selected node; and
   receiving temporary parameters for wireless backhaul communication with said selected node.

8. The method according to claim 7, further comprising:
causing the access point unit to collect data about each said at least one node in the network where the access point unit is deployed;
processing automatically the collected data to determine spatial physical layer parameters of each said at least one node including direction of arrival;
selecting optimal spatial physical layer parameters for the access point unit in view of said determined spatial physical layer parameters; and
automatically configuring the access point unit according to said optimal spatial parameters.

9. The method according to claim 8, wherein said step of causing includes:
performing space and frequency channel sounding;
producing an RF spatial map of environment frequencies, in accordance with said channel sounding;
performing spatial spectral interference management; and
selecting available transmission parameters for each said access point unit.

10. The method according to claim 8, further comprising utilizing beam-forming techniques to perform at least one of virtual sectorization, according to an environment frequency re-use plan, and to set sectorization beams, and frequency bandwidth and/or power for each sector.

11. A method of adding an access point unit having a RF transceiver and at least two antennas performing receive beam forming to a mobile wireless network having at least one node and wireless point-to-point backhaul between nodes, the method comprising:
causing the access point unit to collect data about each said at least one node in the network where the access point unit is deployed;
processing automatically the collected data to determine spatial physical layer parameters of each said at least one node including direction of arrival;
selecting optimal spatial physical layer parameters for the access point unit in view of said determined spatial physical layer parameters; and
automatically configuring the access point unit according to said optimal spatial parameters for both access and wireless backhaul.

12. The method according to claim 11,
wherein said step of processing includes determining spatial physical layer parameters of a plurality of nodes in the network including directions of arrival;
further comprising:
selecting one of said nodes for forming a wireless backhaul connection thereto;
performing standard network entry;
performing MAC registration;
requesting a backhaul slot for wireless backhaul communication with said selected node; and
receiving temporary parameters for wireless backhaul communication with said selected node.

13. The method according to claim 11, wherein a new access point determines which frequency or frequencies are available in which directions, with the least interference from adjacent access points, and then utilizes beam-forming techniques to maximize its own coverage.

14. The method according to claim 11, wherein said step of causing includes:
performing space and frequency channel sounding;
producing an RF spatial map of environment frequencies, in accordance with said channel sounding;
performing spatial spectral interference management; and
selecting available transmission parameters for each said access point unit.

15. The method according to claim 11, further comprising utilizing beam-forming techniques to perform at least one of virtual sectorization, according to an environment frequency re-use plan, and to set sectorization beams, and frequency bandwidth and/or power for each sector.

16. An access point (AP) unit for a mobile broadband wireless network, the access point unit comprising:
an RF transceiver;
at least two omni-directional antennas performing receive beam forming;
means for collecting data of pre-selected spatial network transmission and receiving parameters which are required to determine connection parameters for the AP unit in the network, including directions of arrival;
a processor for processing said collected data and determining, in accordance therewith, optimal spatial transmission and receiving parameters for the AP unit and instruct the AP unit to operate according to said optimal parameters.

17. An access point unit for use in a wireless telecommunications network having a plurality of access point units grouped into virtual clusters, each cluster having one feeder access point unit coupled to and managing all the access point units in the cluster and providing backhaul to a core network, said access point comprising:
a plurality of RF transceivers for wireless access and wireless backhaul communication with other access point units in the cluster,
a plurality of antennas performing receive beam forming, and
a controller,
said controller determining spatial coupling parameters, including direction of arrival, of the access point unit to at least one other access point unit in said network.

18. A method of adding an access point in a WiMAX network having at least one node coupled to a wired backhaul, the method comprising:
providing a WiMAX access point unit having a low cost RF transceiver and a plurality of omni-directional antennas performing receive beam forming;
causing the access point to collect data from the network in an area where it is deployed to permit the access point to determine optimum spatial connection parameters;
processing automatically the collected data including direction of arrival; and
selecting optimal spatial transmission and receiving parameters for the AP unit for connecting itself to the network; and
automatically configuring the AP unit according to said optimal parameters.

19. The method according to claim 18, wherein said step of causing includes:
performing space and frequency channel sounding;
producing an RF spatial map of environment frequencies, in accordance with said channel sounding;
performing spatial spectral interference management; and
selecting available transmission parameters for each said access point unit.

20. The method according to claim 18, further comprising utilizing beam-forming techniques to perform at least one of virtual sectorization, according to an environment frequency re-use plan, and to set sectorization beams, and frequency bandwidth and/or power for each sector.

* * * * *